US008090779B2

(12) United States Patent
Ludwig et al.

(10) Patent No.: US 8,090,779 B2
(45) Date of Patent: Jan. 3, 2012

(54) SYSTEMS AND METHODS FOR VIEWING MEDIA CONTENT IN INSTANT MESSAGING

(75) Inventors: Scott Ludwig, Kirkland, WA (US);
Wesley Carr, Kirkland, WA (US);
Dudley Carr, Kirkland, WA (US);
Kevin Zatloukal, Kirkland, WA (US);
Terry Lucas, Kirkland, WA (US);
Deepak Menon, Kirkland, WA (US);
Michael Jazayeri, Kirkland, WA (US)

(73) Assignee: Google Inc., Mountain View, CA (US)

( * ) Notice: Subject to any disclaimer, the term of this patent is extended or adjusted under 35 U.S.C. 154(b) by 855 days.

(21) Appl. No.: 11/676,841

(22) Filed: Feb. 20, 2007

(65) Prior Publication Data

US 2008/0201437 A1 Aug. 21, 2008

(51) Int. Cl.
*G06F 15/16* (2006.01)
(52) U.S. Cl. ...................................................... 709/206
(58) Field of Classification Search .................. 709/204, 709/205, 206, 207, 231–232, 217–219, 245–246; 715/753

See application file for complete search history.

(56) References Cited

U.S. PATENT DOCUMENTS

| 6,407,680 | B1 | 6/2002 | Lai et al. | |
|---|---|---|---|---|
| 2004/0003090 | A1 | 1/2004 | Deeds | |
| 2004/0267531 | A1 | 12/2004 | Whynot et al. | |
| 2005/0262204 | A1* | 11/2005 | Szeto et al. | 709/206 |
| 2006/0230169 | A1* | 10/2006 | Kaplan et al. | 709/231 |
| 2006/0294195 | A1 | 12/2006 | Hyatt | |
| 2007/0186005 | A1* | 8/2007 | Setlur et al. | 709/231 |
| 2008/0034040 | A1* | 2/2008 | Wherry et al. | 709/204 |
| 2008/0065735 | A1* | 3/2008 | Szeto et al. | 709/206 |
| 2008/0155030 | A1* | 6/2008 | Fortier et al. | 709/206 |

FOREIGN PATENT DOCUMENTS

WO  WO 03/038636 A1  5/2003

OTHER PUBLICATIONS

Korean Intellectual Property Office, International Search Report, International Application No. PCT/US2008/002180, date of completing and mailing, Jul. 9, 2008, 7 pages.
'Instant messaging', Wikipedia, the free encyclopedia [online], [retrieved on Dec. 23, 2006]. Retrieved from the Internet: <URL:http://en.wikipedia.org/wiki/Instant_messaging>, 6 pages.
'Google Talk', Wikipedia, the free encyclopedia [online], [retrieved on Dec. 23, 2006]. Retrieved from the Internet: <URL:http://en.wikipedia.org/wiki/Google_Talk>, 6 pages.

* cited by examiner

*Primary Examiner* — Chirag Patel
(74) *Attorney, Agent, or Firm* — Sterne, Kessler, Goldstein & Fox PLLC

(57) ABSTRACT

Systems and methods for viewing media content in instant messaging are provided. In an embodiment, a first IM server that manages instant messaging of a first IM client receives a chat message having a media address from a second IM client whose instant messaging is managed by a second IM server. A first media recognizer associated with the first IM server recognizes the media address in the chat message. In response to the recognition, the first IM server provides the chat message and a media instruction to the first IM client. In another embodiment, the first IM server obtains media associated with the recognized media address and provides the chat message and the obtained media to the first IM client. In a further embodiment, a system for viewing media content based on presence information in instant messaging is provided.

12 Claims, 7 Drawing Sheets

SYSTEMS AND METHODS FOR VIEWING MEDIA CONTENT IN INSTANT MESSAGING

FIELD OF THE INVENTION

The present invention relates to web communication and media delivery.

RELATED ART

The emergence and development of computer networks and protocols, including the World Wide Web (or simply "the web"), now allows many remote users to communicate with one another. Different types of communication tools have been developed for the web which allow users to communicate in different ways through a browser. One popular type of communication tool is instant messaging (also called chat). Instant messaging (IM) allows users to communicate over the web in real time. A user uses a client program (called an IM client) that communicates with an instant messaging service over the web. The IM client has a graphical user-interface (GUI) that allows a user to input text and view text.

IM communication has generally involved typing text. For example, two users chatting may type lines of text in each of their IM client programs. The instant messaging service passes the typed text between the IM clients. The lines of text may resemble a conversation in that successive lines of text are displayed in a temporal sequence along with an indication of the user who typed the text. Often this indication of the user is a display of the user's screen name (also called an IM address). IM clients have historically had simple GUIs with rectangular window displays in which the text of a chat is made to scroll as the conversation proceeds.

Different IM services and IM client programs have different features relating to the chat experience. For example, instant messaging services often provide presence information that indicates whether people on one's list of contacts are currently online and available to chat. Some IM services also allow a user to set an "online status" or "away message" so that other users are aware of the user's availability to chat. Finally, users can often personalize their profiles to change graphical features associated with their chat. For instance, a user often has a screen name which is displayed to another to identify himself or herself when he or she is chatting. The screen name itself may be selected by the user (or assigned by the IM service). A user may also choose different font colors, font styles, symbols, or personalized images to be displayed along with his or her screen name. Examples of IM services include the Microsoft .NET Messenger Service, AOL Instant Messenger, Excite PAL, Gadu-Gadu, Google Talk, iChat, ICQ, Jabber, Qnext, QQ, Meetro, Skype, Trillian, Yahoo! Messenger and Rediff Bol Instant Messenger. See, "Instant messaging," as described on Wikipedia on Dec. 23, 2006, at <http://en.wikipedia.org/wiki/Instant_messaging>.

The limitation to text in instant messaging is at odds with other developments on the web. For instance, media content is increasingly available on the web. Many web sites stream media to browsers allowing users to view a variety of rich media content. Users themselves also have different types of media files that they wish to share with one another. Currently, techniques for file transfer, such as e-mail, podcasting, or a file transport protocol (ftp), tend to involve a number of different steps and procedures. This can inconvenience or disrupt an ongoing chat. For example, if two users are chatting and wish to share media content, they must initiate a separate file transfer process outside of their IM clients and switch between different applications and window displays.

The inventors recognized that media content needs to be included in instant messaging. Users need to be able to view media content. Users also need to be able to personalize their profiles with media content.

SUMMARY OF THE INVENTION

The present invention relates to systems and methods for viewing media content in instant messaging. In an embodiment, a system for viewing media content in instant messaging is provided. A first instant messaging (IM) server manages instant messaging with a first IM client. A second instant messaging (IM) server manages instant messaging with a second IM client. The first and second IM servers further include first and second media recognizers respectively.

The first IM server receives a chat message having a media address from the second IM client. The first media recognizer recognizes the media address in the chat message. In response to the recognition, the first IM server provides the chat message and media instruction to the first IM client.

Alternatively, in another embodiment, the first IM server obtains media associated with the recognized media address and provides the chat message and the obtained media to the first IM client. In one example, the first IM server further includes a transcoder that can transcode a format of media fetched from the media address to another format compatible with a media player at the first IM client.

In a further embodiment, a system for viewing media content based on presence information in instant messaging is provided. A first IM server manages instant messaging with a first IM client including presence information of other users that are associated with a user at the first IM client. The presence information can include a media address. A first media recognizer can recognize the media address in the presence information. In response to the recognition, the first IM server provides a chat message and media instruction to the first IM client. Alternatively, in another embodiment, the first IM server obtains media associated with the recognized media address in the presence information and provides a chat message and the obtained media to the first IM client.

A method for viewing media content in instant messaging includes inputting a media address in a chat window at a first IM client, the first IM client's instant messaging managed by a first IM server; forwarding a chat message with the input media address to a second IM server that manages the instant messaging of a second IM client; recognizing the media address in the chat message; in response to the recognition, providing the chat message and a media instruction to the second IM client; and displaying media corresponding to the media instruction in a conversation window of the second IM client.

In another embodiment, a method for viewing media content in presence information in instant messaging is provided. This method includes receiving presence information with a media address at an IM server; recognizing the media address in the presence information; in response to the recognition, providing a chat message and a media instruction to an IM client; and displaying media corresponding to the media instruction in a conversation window of the IM client.

In this way, media content can be included in instant messaging. Users may view media content in real time while instant messaging. Users can share or transfer media content during a chat in real time. Users may also personalize their profiles with media content.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS

The present invention relates to systems and methods for viewing media content in instant messaging. In embodiments, easy sharing and playback of videos, pictures, and other media in an instant messaging application may be done. A user can share media with another user through IM clients over the World Wide Web. The media may be viewed and played, and is viewable directly within an instant messaging application, including chat windows or profile cards.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The terms "instant messaging" (IM) and "chat" are used interchangeably herein to refer broadly and inclusively to any instant messaging application, protocol, framework or service as would be apparent to a person skilled in the art given this description. Examples of IM services (including IM servers and IM clients) which may be adapted to incorporate embodiments of the present invention as described herein include, but are not limited to, the Microsoft .NET Messenger Service, AOL Instant Messenger, Excite PAL, Gadu-Gadu, Google Talk, iChat, ICQ, Jabber, Qnext, QQ, Meetro, Skype, Trillian, Yahoo! Messenger and Rediff Bol Instant Messenger.

The term "media content" is used herein to refer broadly and inclusively to any type of media including, but not limited to, video, audio, animation, or still image.

Figure 1:
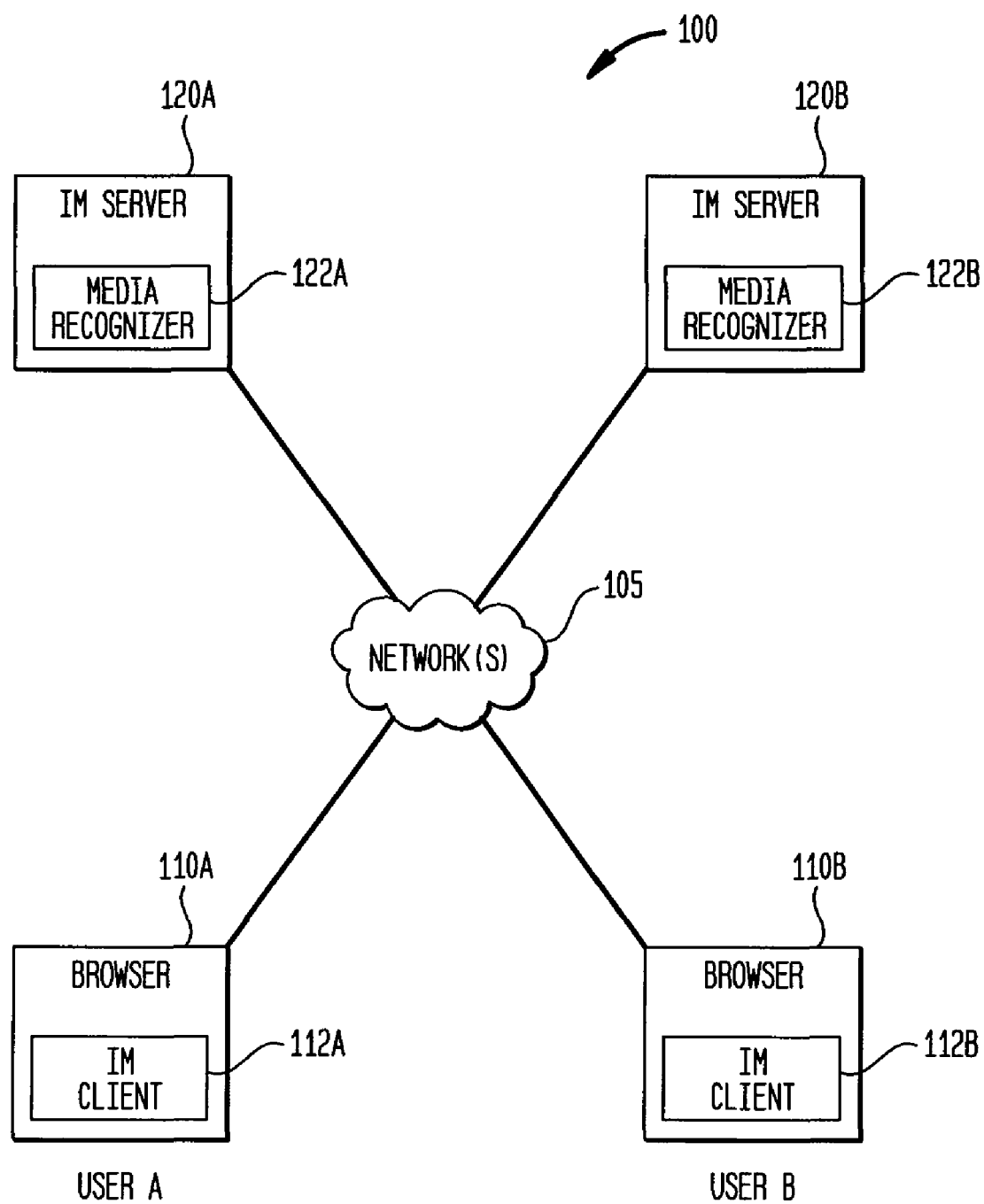
FIG. 1 is a diagram of a system for viewing media content in instant messaging according to an embodiment of the present invention.

FIG. 1 is a diagram of a system 100 for viewing media content in instant messaging between two users A and B according to an embodiment of the present invention. System 100 includes a browser 110A coupled to an IM server 120A over one or more networks 105. Browser 110A further includes an IM client 112A. A browser 110B is also coupled to an IM server 120B over one or more networks 105. Browser 110B further includes an IM client 112B. IM server 120A is further coupled to IM server 120B over one or more networks 105.

Network(s) 105 can be any network or combination of networks that can carry data communication. Such network(s) 105 can include, but are not limited to, a local area network, medium area network, and/or wide area network such as the Internet. Network(s) 105 can support protocols and technology including, but not limited to, World Wide Web protocols and/or services. Intermediate web servers, gateways or other servers may be provided between browsers 110A, 110B and IM servers 120A, 120B, and between IM servers 120A, 120B depending upon a particular application or environment.

Client browsers 110A, 110B and IM clients 112A, 112B can be implemented in software, firmware, hardware, or any combination thereof. Client browsers 110A, 110B and IM clients 112A, 112B can be implemented to run on any type of processing device including, but not limited to, a computer, workstation, distributed computing system, embedded system, stand-alone electronic device, networked device, mobile device, set-top box, television, or other type of processor or computer system. Client browsers 110A, 110B and IM clients 112A, 112B can also be used in a variety of applications in combination with instant messaging (or in instant messaging alone).

Similarly, IM servers 120A, 120B and media recognizers 122A, 122B can be implemented in software, firmware, hardware, or any combination thereof. IM servers 120A, 120B and media recognizers 122A, 122B can be implemented to run on any type of processing device including, but not limited to, a computer, workstation, distributed computing system, embedded system, stand-alone electronic device, networked device, mobile device, set-top box, television, or other type of processor or computer system. IM servers 120A, 120B and media recognizers 122A, 122B can also be used in a variety of applications in combination with instant messaging (or in instant messaging alone).

System 100 can be used is a stand-alone system or in connection with a search engine, web portal, or other web site to allow remote users to engage in instant messaging with media content viewing. IM servers 120A, 120B can operate alone or in tandem with other servers, web servers, or devices and can be part of any search engine, portal, or web site.

Functionality described herein is described with respect to components or modules for clarity. However, this is not intended to be limiting, as functionality can be implemented on one or more modules on one device or distributed across multiple devices.

In operation, IM server 120A manages instant messaging with IM client 110A. IM server 120B manages instant messaging with IM client 110B. When user A and user B begin chatting, IM clients 110A, 110B each provide user-interfaces that include conversation windows for users A and B to input their respective chat text. Optional presence information may also be made available so that users A and B know if they are available to chat (or if others are available to chat).

As the users chat, IM clients 112A, 112B pass chat messages to respective IM servers 120A, 120B. The chat messages are forwarded between IM servers 120A, 120B, and from there, forwarded to respective IM clients 110A, 110B.

Chat message displays may then be displayed by IM clients 110A, 110B for users A and B to view.

According to a feature, IM server 120A further includes a media recognizer 122A. IM server 120B likewise includes a media recognizer 122B. In-bound chat messages to IM servers 120A,120B are reviewed by the respective media recognizers 122A, 122B. Media recognizers 122A, 122B parse or review the message content to identify an address associated with media content (referred to herein as a media address). Such an address may be for example a web address, such as a Uniform Resource Locator (URL) (also called a Uniform Resource Identifier), where one or more media files are stored. To reduce work, only in-bound chat messages passing from IM servers 120A,120B to their respective IM clients 110A, 110B may be reviewed.

When a media recognizer 122A, 122B recognizes a media address in a chat message, an alert or command may be sent to the respective IM servers 120A, 120B. In response, IM servers 120A, 120B can output a media instruction or the media itself. When a media instruction is output, burden is placed on a browser (or IM client) to obtain the media for play by a media player at the browser. For instance, in one embodiment, when a media address is recognized, IM servers 120A, 120B provide a chat message and media instruction to their respective IM clients 112A, 112B. IM client 112A, 112B then may use the media instruction to instruct an appropriate media player to play media corresponding to the media instruction in a conversation window of the IM client 112A, 112B.

In another embodiment, IM servers 120A, 120B can obtain the media at the media address and output the media in instant messaging to the browsers 110A, 110B (or IM clients 112A, 112B). In one example, IM servers 120A, 120B can include or communicate with transcoders (not shown) to transcode media that is obtained to a format associated with their respective IM clients 112A, 112B.

In one feature, a media address may be input by a user directly into a chat conversation window. In another feature, a media address may be part of presence information. For example, a media address may be input into a profile card including, but not limited to, a static display profile card or a hovercard that pops up when a mouse is near a contact.

In the embodiments herein any type of media player may be used including, but not limited to, a Macromedia (Adobe) FLASH Player, Apple QuickTime Player, Real Player, or Microsoft Windows Media Player. Such media players can be part of browsers 110A, 110B or separate components coupled to browsers 110A, 110B. In other examples, such media players can be part of IM clients 112A, 112B or separate components coupled to IM clients 112A, 112B.

Figure 2:
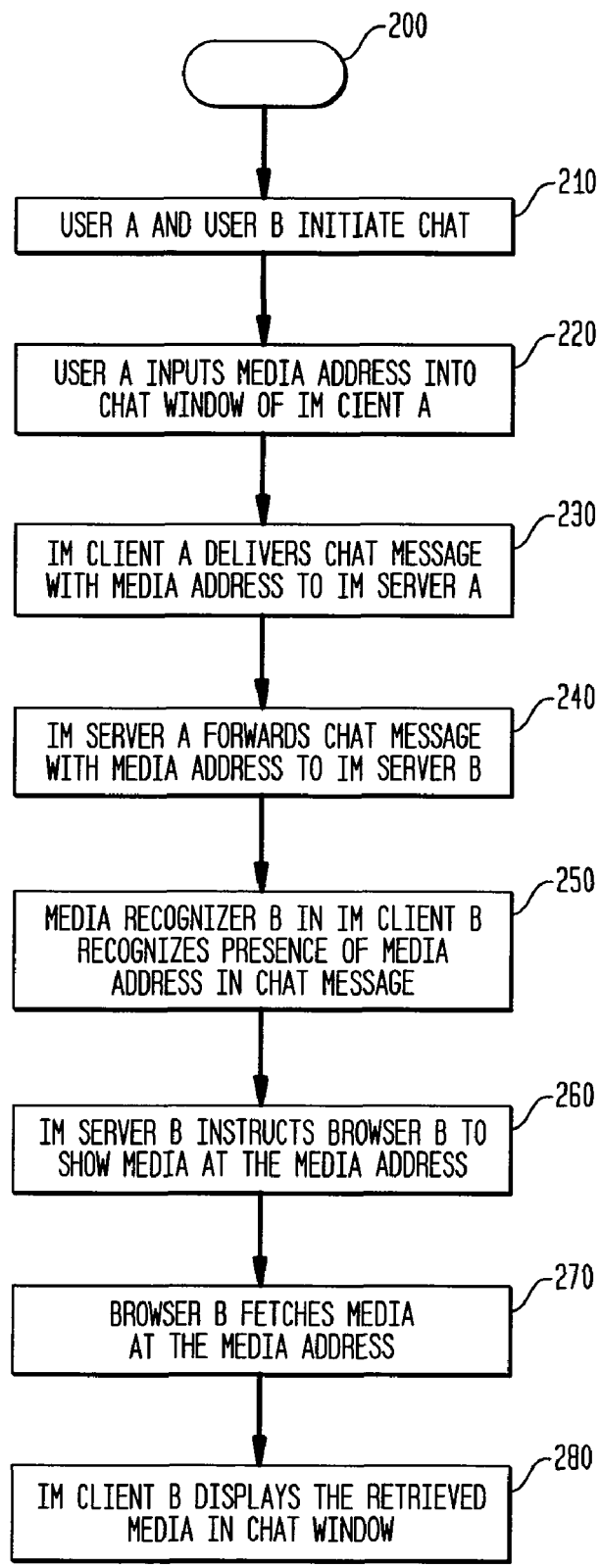
FIG. 2 is a flowchart diagram that shows a routine for viewing media content in instant messaging according to an embodiment of the present invention.
Figure 3:
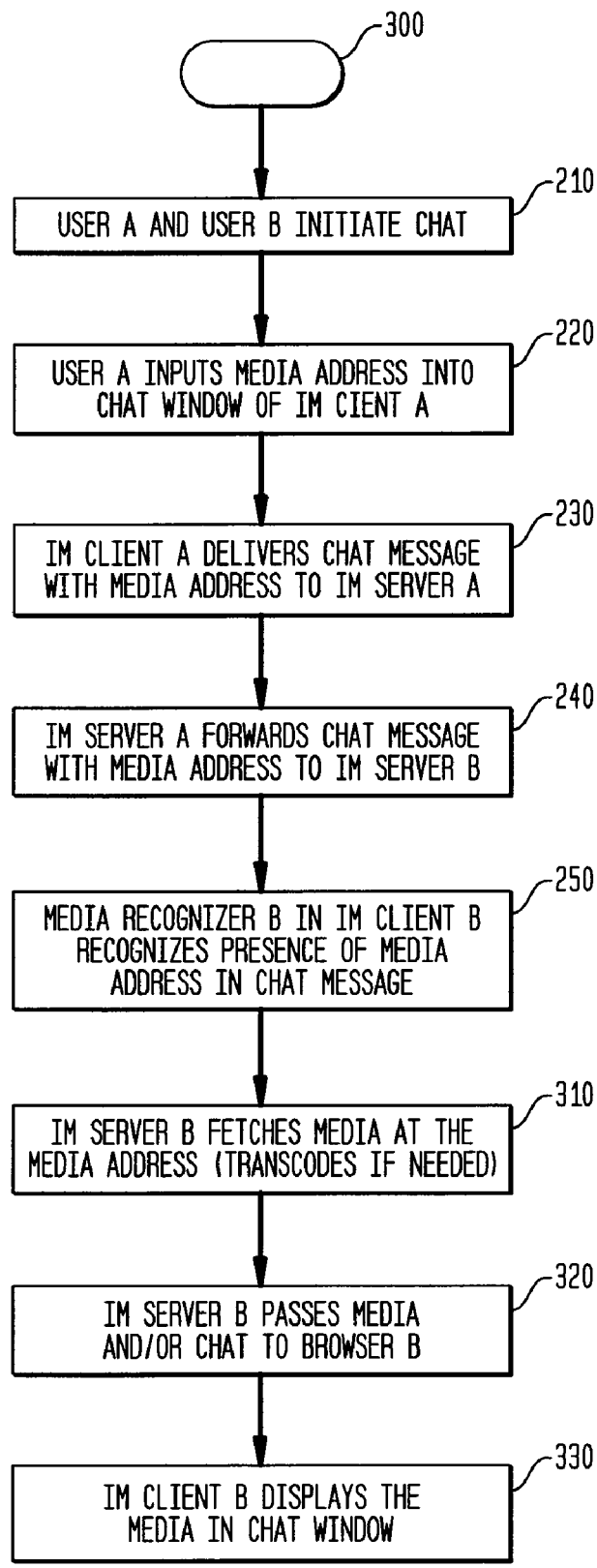
FIG. 3 is a flowchart diagram that shows a routine for viewing media content in instant messaging according to another embodiment of the present invention.

For brevity, embodiments and the operation of system 100 are further described with respect to routines 200 and 300 in FIGS. 2 and 3. Routines 200 and 300 are not necessarily limited however to the structure of system 100.

FIG. 2 shows a routine 200 for viewing media content in instant messaging where a media instruction is passed according to an embodiment of the present invention (steps 210-280). Users A and B initiate a chat session (step 210). User A may input a media address in a chat window of IM client 112A (step 220). The media address can be an address for media content that User A wishes to share with User B. User A can type, paste, drag, select, speak, or otherwise enter the address into the chat window depending upon the particular user-interface of the IM client 112A. IM client 112A then delivers a chat message with the media address to IM server 120A (step 230). IM server 120A forwards the chat message with the media address to IM server 120B as part of an instant messaging service (step 240).

In step 250, media recognizer 122B recognizes the presence of the media address in the received chat message and alerts IM server 120B. IM server 120B then instructs browser 110B (or IM client 112B) to show media at the media address (step 260). For instance, browser 110B may fetch media at the media address (step 270). IM client 112B may then display the retrieved media in a conversation window during instant messaging. In one example, the media is displayed in the same conversation window where text chat is occurring. In another example, a separate window is opened to play media content alongside of the window where text chat is occurring.

FIG. 3 is a flowchart diagram that shows a routine 300 for viewing media content in instant messaging where media content is delivered by an IM server according to another embodiment of the present invention (steps 210-250 and 310-330). Routine 300 proceeds in steps 210-250 as described above. After step 250 where a media address is recognized, however, IM server 120B fetches media content at the media address (step 310). Optional transcoding can be carried out to convert the file format of media content to a file format that can be played at IM client 112B. In step 320, IM server 120B passes the media and/or further chat to browser 110B. Browser 110B may then instruct a supported media player to play the media. IM client 112B then displays the media in a conversation chat window (step 330). Again, in one example, the media is displayed in the same conversation window where text chat is occurring. In another example, a separate window is opened to play media content alongside of the window where text chat is occurring.

Conversation Window Example

Figure 4:
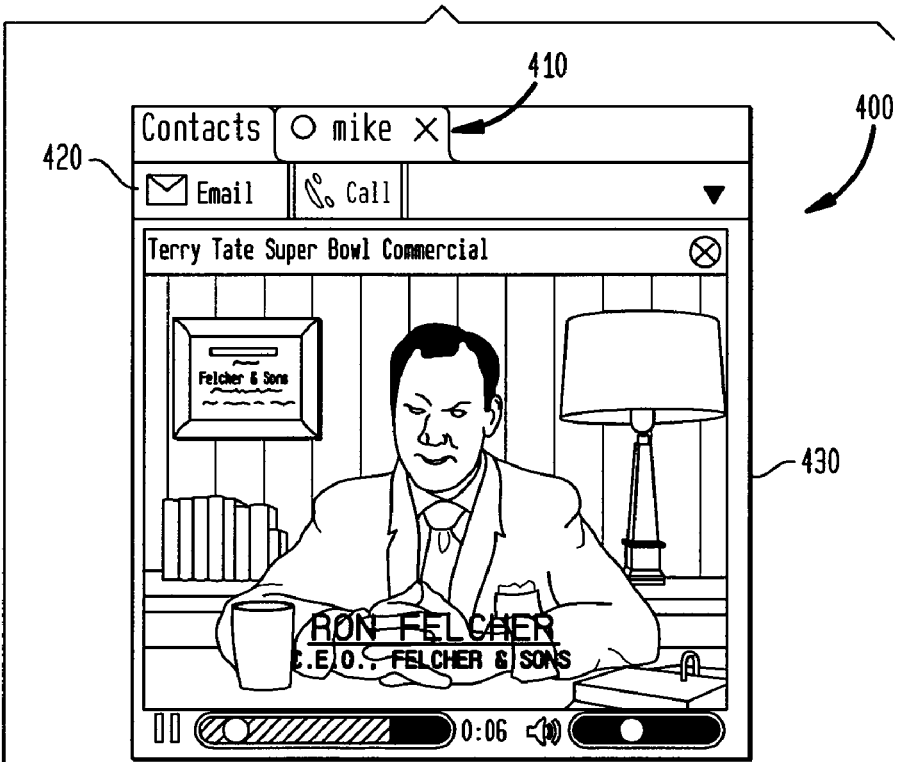
FIG. 4 is a diagram of an example conversation window in which media content can be viewed according to an embodiment of the present invention.
Figure 4:
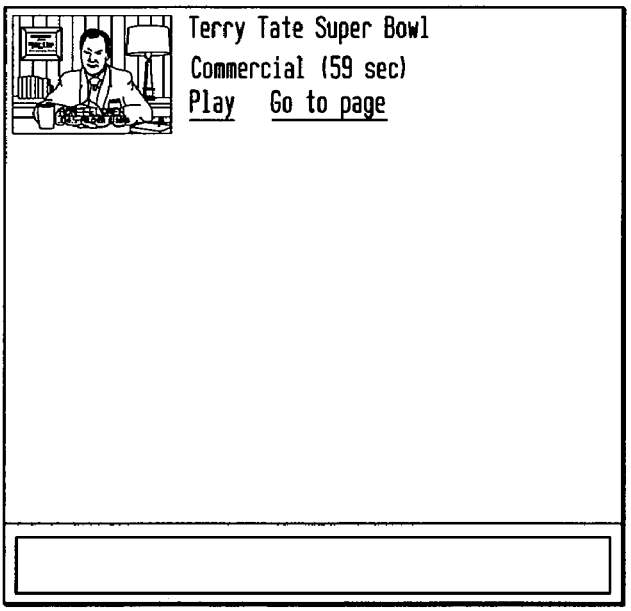

FIG. 4 is a diagram of an example conversation window 400 in which media content can be viewed and media addresses input according to an embodiment of the present invention. This window is illustrative and not intended to limit the present invention to this specific example or its features. Conversation window 400 may include a title bar or tab 410, menu bar 420, and message window 430. Title bar 410 may display the contact's display name and his or her current presence. A "Close" icon to close a window may also be provided. Menu bar 420 may include commands regarding the chat, such as, place a call, access email, and/or other commands as desired. Message window 430 is an area in which media content can be displayed. In the example of FIG. 4, a video file (such as a video clip of a television commercial) is displayed in window 430 along with controls and indicators, such as, a pause or play button, elapsed time of play indicator, or volume control. A message area below the media content may also include text of an ongoing chat. Other text may be automatically added regarding the media content. For example, descriptive text may be added to indicate that the user is sharing a video. A thumbnail image and playing time length may also be displayed. Controls such as a play button or go to button (which can be links) can also be provided in message window 430. In another example, media content in message window 430 can include a preview image of a website associated with a link a user has sent in a chat message for another user to see.

Message windows (such as, window 430) may also support different modes such as in-page, in-line, or popout. In-page may have the message window as part of the web page flow with fixed width and height. An in-line mode may have a chat window inline within a browser window, but separate from a chat contact list, appear when a cursor is near an area. A pop-out message window may be a message window that lives in its own browser chrome.

Other instant messaging functionality such as inputting emoticons and playing sounds may be provided in message windows. A message window in conjunction with a window manager, may decide whether or not to play sounds on receipt of new messages.

Profile Card Example

Figure 5A:
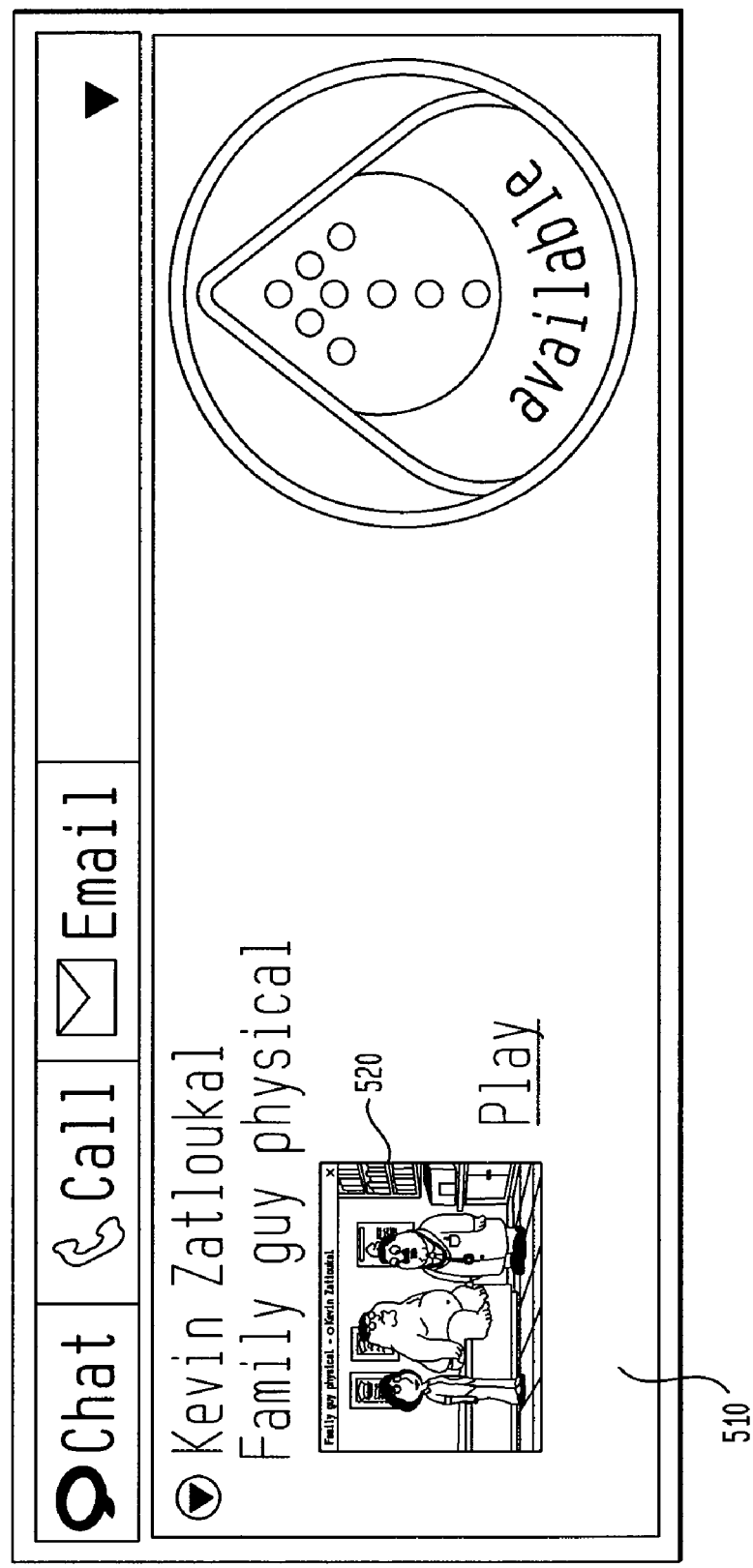
FIGS. 5A and 5B are diagrams that illustrate an example profile card having media content according to another embodiment of the present invention.
Figure 5B:
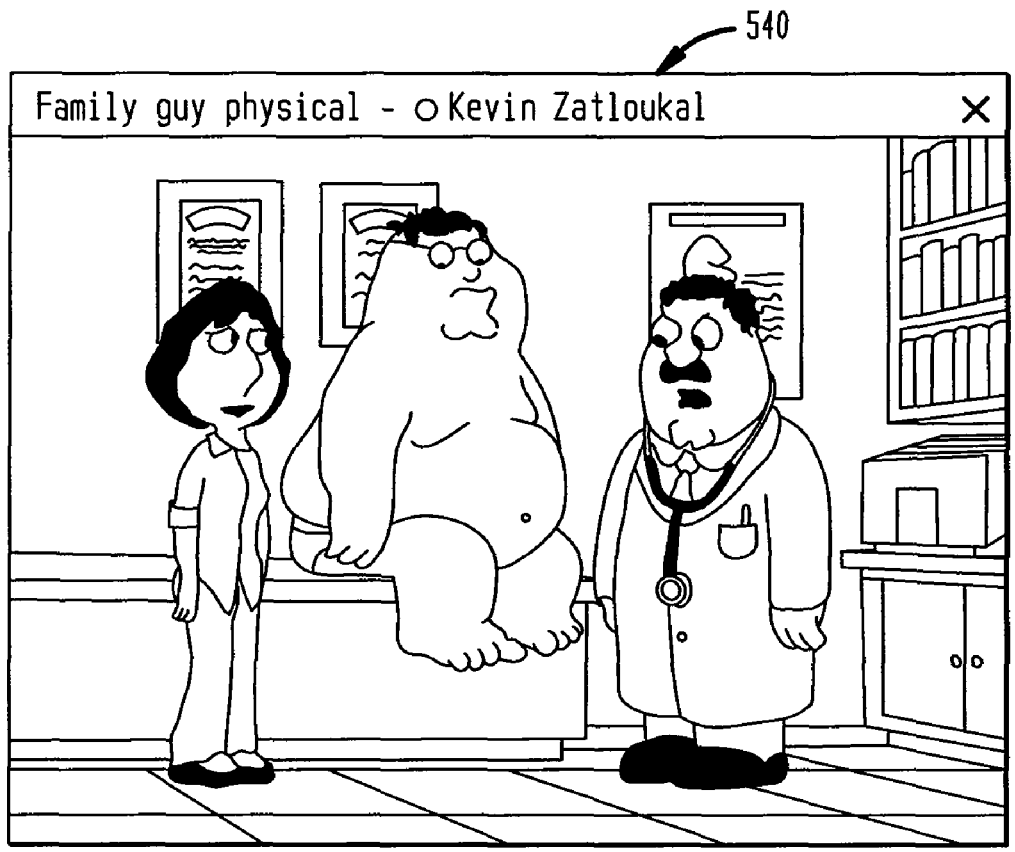

FIGS. 5A and 5B are diagrams of an example profile card 500 that can include presence information with media content according to another embodiment of the present invention. Profile card 500 for instance can have a message area 510 that displays presence information. The presence information can include user display name, contact presence, status message, avatar, contact information, email address, or other data. According to a feature of an embodiment, message area 510 with the presence information can also include a thumbnail image 520 of media content to be viewed. A "play" button can also be provided next to the image. A link, URL address, or other identifier of the media file itself can also be displayed if desired. A user can select the thumbnail image 520 or select the play button (or link) in the profile card to open a new window 540 that displays the selected media content (FIG. 5B). In another example, image 520 can include a preview image of a website associated with a link a user (or other entity) has selected for his or her profile card. Profile card 500 is illustrative and not intended to limit the present invention. Other types of profile cards, hovercards, or other profile or presence information can be used.

Web Connection Services

Figure 6:
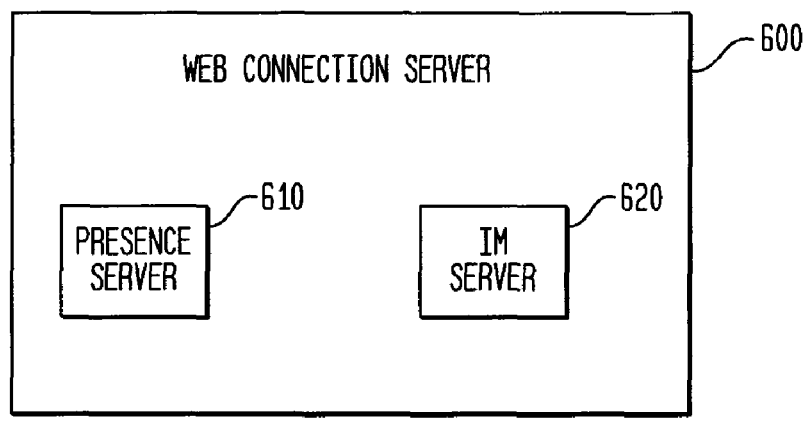
FIG. 6 is a diagram of a web connection server supporting IM with media content viewing, presence, and web connectivity according to another embodiment of the present invention.

According to a further embodiment, the present invention can also include web connectivity along with presence and instant messaging. FIG. 6 is a diagram of an example web connection server 600 supporting IM with media content viewing, presence, and web connectivity according to another embodiment of the present invention. A web connection server 600 can be used in place of each of IM servers 120A, 120B. Web connection server 600 includes a presence server 610 and IM server 620. Presence server 610 manages presence to support instant messaging applications. IM server 620 manages instant messaging between clients as described above with respect to IM servers 120A, 120B.

Example IM Client Implementation

Figure 7:
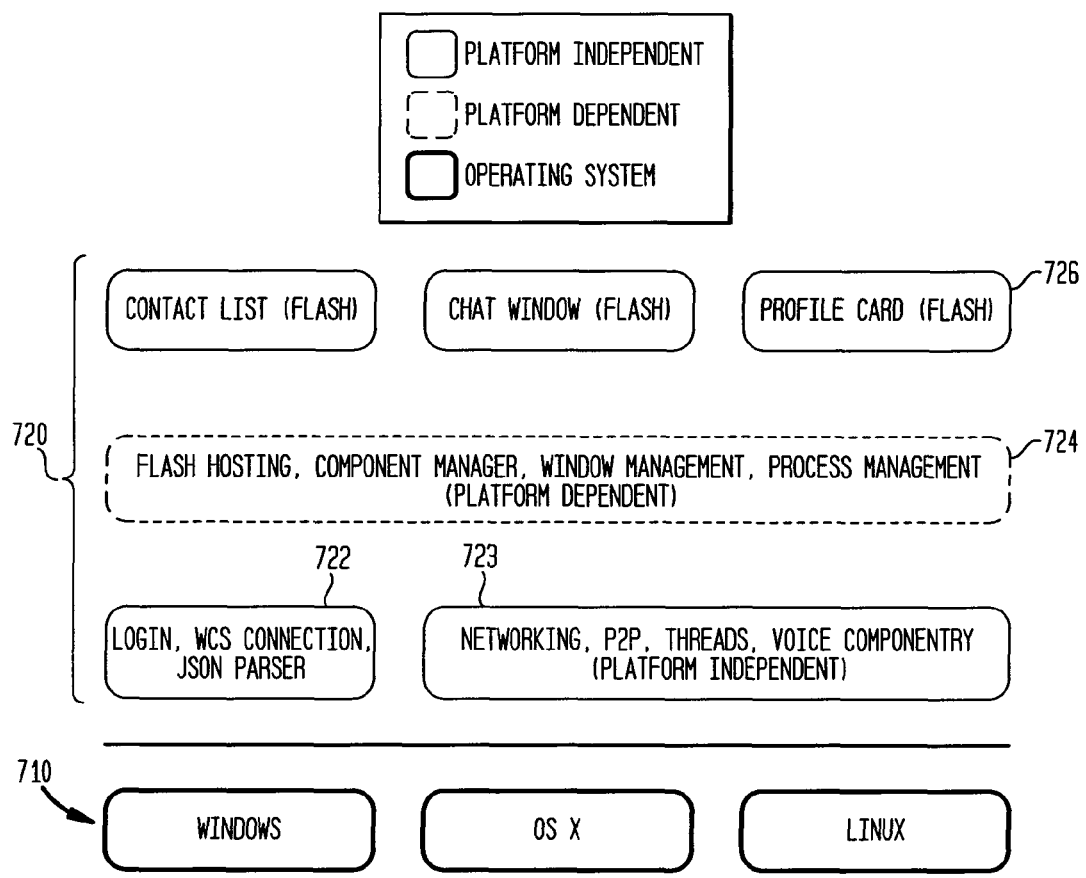
FIG. 7 is a diagram of an example IM client according to another embodiment of the present invention.

FIG. 7 is a diagram of an example IM client 700 and its architecture according to another embodiment of the present invention. This example is illustrative and not intended to limit the present invention. IM client 700 can support multiple platforms. IM client 700 includes an operating system layer 710 and higher components layer 720. Operating system layer 710 can include any operating system, including but not limited to, Linux available from Red Hat, OS X available from Apple Corporation, or Microsoft Windows operating system. Higher components layer 720 can include components for carrying out various IM client operations. In one example, web connectivity components 722 can manage log-in, web connectivity, and parsing. Other components 723 can support networking, peer-to-peer, threads, and voice operations. An IM client management layer 724 supports FLASH hosting, component management, window management, and process management. A user-interface layer 726 supports a contact list, chat window, and profile card display. In one example, the user-interface layer 726 is implemented in Macromedia FLASH. IM client 700 can run on any type of hardware including any type of processing device including, but not limited to, a computer, workstation, distributed computing system, embedded system, stand-alone electronic device, networked device, mobile device, set-top box, television, or other type of processor or computer system.

A cell renderer may be used in IM client 700 to render each incoming message in a message window. This can support rendering of and interaction with messages. The cell renderer can include elements that are customizable. A motivation for using a cell renderer for each message is that some messages can be set apart. For example, offline messages could have a different background color to visually set them apart from new conversation messages. Another example of a cell renderer would be a file transfer progress indicator. In the file transfer case, the cell renderer may show progress of the file transfer in progress. Cell renderers may be especially helpful when showing shared content such as a photo or application specific messages that could trigger an action on the current page.

Different cell renderers can be used to support regular instant messaging. A special cell renderer may be used for messages containing emoticons. An emoticon is a string of punctuation in the form of a human face expressing an emotion. When an emoticon string is recognized, a graphical icon (such as of a smiling, frowning, or surprised face, for example) or other image can replace the emoticon in the message. Since FLASH text fields may have very limited support for in-lining images, however, the emoticons may have to be overlaid on top of the text.

Using cell renderers can create an implementation hurdle in a FLASH environment. Since each message is in a separate cell renderer element, selection across messages is not necessarily native to FLASH. In one implementation, since cell renderers may be FLASH objects implementing a specific application programming interface (API), cell renderers can be loaded externally. The advantage of doing so is that other properties can build cell renderers to be used for specific message types. For example, a photosharing application, such as, PicasaWeb available from Google, Inc., could provide a cell renderer for photos. If a PicasaWeb picture is sent via the client to a contact, the message window would download the cell renderer to display the PicasaWeb message for the contact. Similarly, a photo album viewer could be created for shared PicasaWeb photo albums, and a video viewer could be created for videos from a video sharing service, such as, Google Video available from Google, Inc., and/or other services.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A system for viewing media content in instant messaging (IM) between at least two IM clients coupled to an IM server, the system comprising:

an instant messaging (IM) server that manages instant messaging with a first IM client having an installed media player;

a media recognizer that is coupled to the IM server; and at least one processing device that executes the IM server and the media recognizer, wherein the IM server receives a message having a media address from a second IM client, the media recognizer recognizes the media address in the message, and in response to the recognition, the IM server obtains a media content item associated with the recognized media address, the media content item having a first media format incompatible with the installed media player at the first IM client wherein the IM server further includes a transcoder that is configured (i) to determine a second media format compatible with the installed media player at the first IM client, the second media format being different from the first media format, and (ii) to transcode the media content item having the first media format to obtain a transcoded media content item having the second media format, and wherein the IM server provides the message and the transcoded media content item to the first IM client.

2. The system of claim 1 wherein the message is a chat message, and wherein the media address comprises a web address inputted into the message at a conversation window at the second IM client, the web address addressing a network location of the media content item.

3. The system of claim 1, wherein the media address comprises a web address present in a profile of a user at the second IM client, the web address addressing the media content item.

4. The system of claim 1, wherein the first IM client further includes a cell renderer for rendering a conversation window to present the media content item output by the media player.

5. A computer-implemented method for viewing media content in instant messaging (IM) between a first and second IM client coupled to an IM server, the method comprising:
   (a) receiving, at the IM server, a message having a media address from the second IM client;
   (b) recognizing, at the IM server, the media address in the message;
   (c) in response to the recognition in (b), obtaining a media content item associated with the recognized media address, the media content item having a first media format incompatible with the installed media player at the first IM client;
   (d) determining a second media format compatible with the installed media player at the first IM client, the second media format being different from the first media format;
   (e) transcoding, at the IM server, the media content item having the first media format to obtain a transcoded media content item having the second media format; and
   (f) providing the message and the transcoded media content item to the first IM client,
   wherein steps (a)-(f) are executed by at least one processing device.

6. The method of claim 5, wherein the message is a chat message, and wherein the media address comprises a web address inputted into the message at a conversation window at the second IM client, the web address addressing a network location of the media content item.

7. The method of claim 5, wherein the media address comprises a web address present in a profile of a user at the second IM client, the web address addressing a network location of the media content item.

8. The method of claim 5, wherein the first IM client further includes a cell renderer for rendering a conversation window to present the media content item output by the media player.

9. A non-transitory program storage device tangibly embodying a program of instructions executable by a processor to perform a method for viewing media content in instant messaging (IM) between a first and second IM client coupled to an IM server, the method comprising:
   (a) receiving, at the IM server, a message having a media address from the second IM client;
   (b) recognizing, at the IM server, the media address in the message;
   (c) in response to the recognition in (b), obtaining a media content item associated with the recognized media address, the media content item having a first media format incompatible with the installed media player at the first IM client;
   (d) determining a second media format compatible with the installed media player at the first IM client, the second media format being different from the first media format;
   (e) transcoding, at the IM server, the media content item having the first media format to obtain a transcoded media content item having the second media format; and
   (f) providing the message and the transcoded media content item to the first IM client.

10. The program storage device of claim 9, wherein the message is a chat message, and wherein the media address comprises a web address inputted into the message at a conversation window at the second IM client, the web address addressing a network location of the media content item.

11. The program storage device of claim 9, wherein the media address comprises a web address present in a profile of a user at the second IM client, the web address addressing a network location of the media content item.

12. The program storage device of claim 9, wherein the providing provides the message and the transcoded media content item to the first IM client which further includes a cell renderer for rendering a conversation window to present the media content item output by the media player.

* * * * *

UNITED STATES PATENT AND TRADEMARK OFFICE
CERTIFICATE OF CORRECTION

| | | |
|---|---|---|
| PATENT NO. | : 8,090,779 B2 | |
| APPLICATION NO. | : 11/676841 | |
| DATED | : January 3, 2012 | |
| INVENTOR(S) | : Scott Ludwig | |

It is certified that error appears in the above-identified patent and that said Letters Patent is hereby corrected as shown below:

Column 9, line 6, insert a --,-- after "IM client" to read --IM client,--.

Column 9, line 18, insert a --,-- after "claim 1" to read --claim 1, wherein--.

Signed and Sealed this
Twenty-seventh Day of March, 2012

David J. Kappos
*Director of the United States Patent and Trademark Office*